July 16, 1968  L. KLEIN  3,392,761
WORK TABLE WITH DEPRESSIBLE FENCE POSITIONING POSTS
Filed June 20, 1966
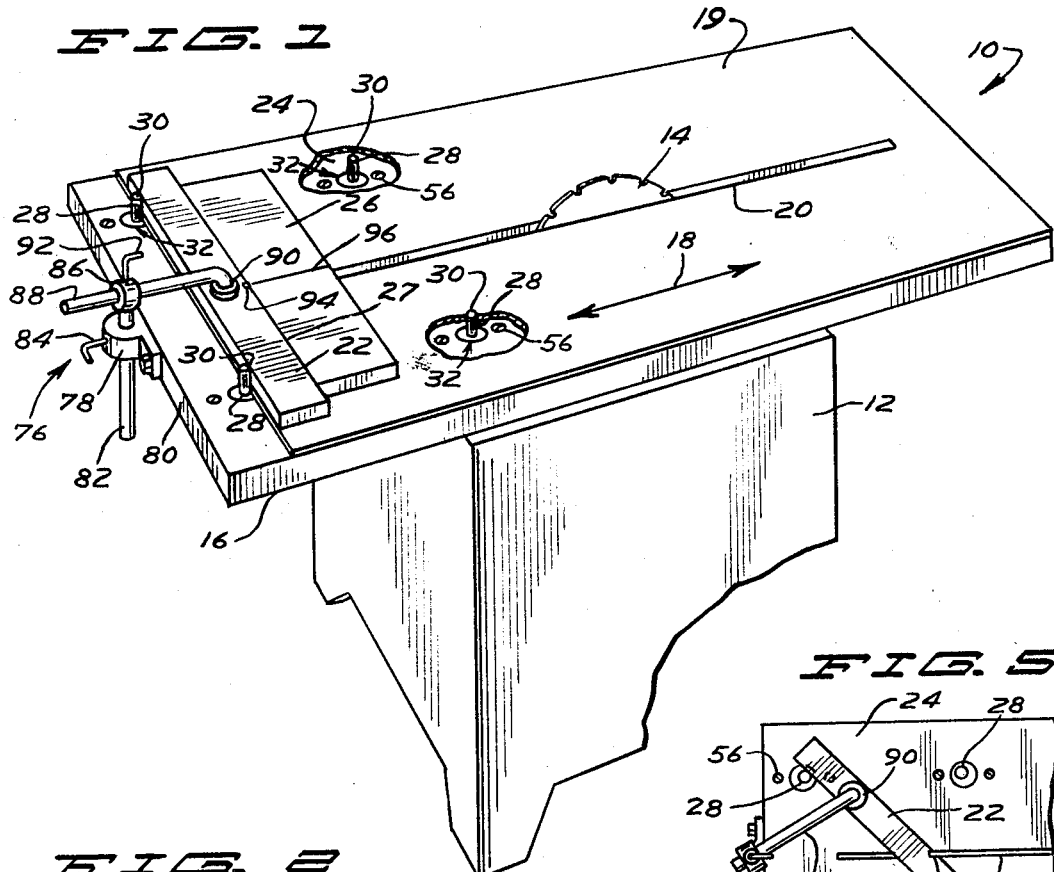
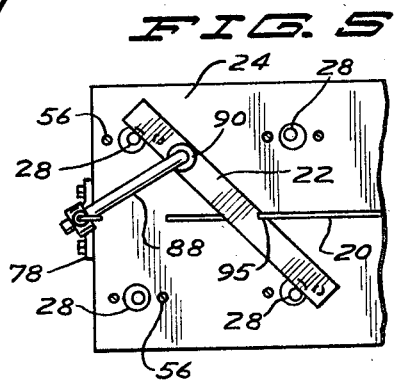
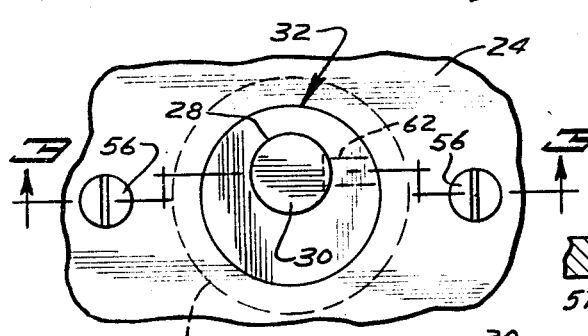
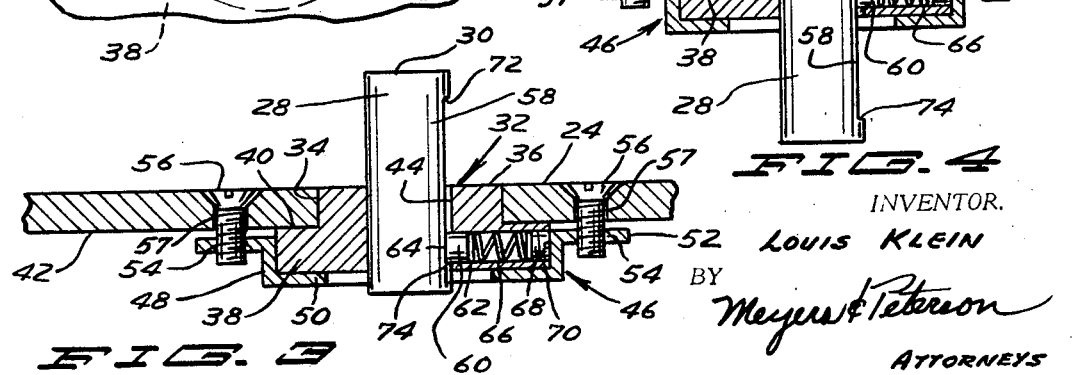
INVENTOR.
Louis Klein
BY Meyers & Peterson
ATTORNEYS United States Patent Office 3,392,761
Patented July 16, 1968

3,392,761
WORK TABLE WITH DEPRESSIBLE FENCE
POSITIONING POSTS
Louis Klein, 569 Sheppard Ave. W., Apt. 1202,
Downsview, Ontario, Canada
Filed June 20, 1966, Ser. No. 558,708
10 Claims. (Cl. 143—52)

This invention relates to power saws of the type employing a sliding work-supporting table which is movable with respect to the blade of the saw to bring the work into contact with the blade. More particularly, the invention relates to such a power saw in which provision is made to support the work at predetermined orientations with respect to the sawblade.

In the practice of the present invention, a fence member, which is usually made of waste material, is positioned on and clamped to the surface of a sliding table saw to provide a work stop abutment of any desired length for supporting the work at a predetermined orientation on the table. It is an object of the invention to provide a power saw having a work supporting table adapted for use in this fashion, the table being provided with a plurality of fence positioning posts mounted in the table in such a manner that they may be depressed downward into the table or extended upward from the table to be used as desired.

It is another object of the invention to provide an improved work-supporting table as set out in the foregoing object, and in which the positions of the various fence positioning posts on the table are adjustable so that the fence member may be positioned at exactly the proper angle with respect to the sawblade. A related object of the invention is the provision whereby any adjustment of these positioning posts may be accomplished from above the table.

It is still another object of the invention to provide a method of preparing or establishing a fence on a sliding table saw, the fence being provided with a profile or outline cut of the sawblade itself against which the workpiece can be adjusted for precisely-indicated cutting.

Still another object of the invention is to provide an arrangement which reduces splintering at the back and bottom of a workpiece where the sawblade cuts through.

Briefly described, the preferred embodiment of the present invention includes a plurality of fence positioning posts mounted in the table of a sliding table saw at predetermined locations such that any two will define a line at a predetermined angle with respect to the direction of the saw cut. The fence member itself may be a piece of milled stock, dressed on four sides and generally of waste, which is positioned in abutment with a desired two of the positioning posts and then clamped in place on the table to define the fence. Means are provided for mounting each of the positioning posts in the table for axial sliding movement into an extended operative position or to a retracted position in which the post is depressed flush with or below the surface of the table so as to provide an unobstructed surface thereon. The mounting means for the positioning posts also provide for fine adjustment of the lateral position of the positioning posts on the table so that an accurate angular position may be established for any particular fence member.

The use of a fence member made up from disposable material in the manner described above provides a unique method of aligning the work for cutting. Thus, after the fence member has been placed on the table, adjusted as to angle and secured in place, the table may be advanced to bring the fence member itself into contact with the sawblade to cut a notch in the fence member. This notch may then be used as an exact indication or index of the outline of the sawblade teeth against which a mark on the work may be aligned.

Other objects, advantages and new features of the present invention will become apparent from the following detailed description when read in conjunction with the accompanying drawings wherein:

FIGURE 1 is a perspective view of a sliding table saw constructed in accordance with the present invention, with parts broken away and showing a workpiece in place on the table;

FIGURE 2 is a partial plan view of the surface of the table showing the eccentric mounting of a positioning post;

FIGURE 3 is a vertical sectional view through one of the positioning posts and its mounting means, taken on the line 3—3 of FIGURE 2 and showing the positioning post in its extended position;

FIGURE 4 is a view similar to FIGURE 3, but showing the post in the depressed position thereof; and FIGURE 5 is a partial plan view illustrating a 45° orientation of a fence member.

A sliding table power saw constructed in accordance with the present invention is indicated generally at 10 in FIGURE 1. Essentially, the saw 10 consists of a base member 12, a sawblade 14 and a work-supporting table 16 which is slideably mounted on the base 12 on suitable guides, not shown, for reciprocating movement in the direction of the arrows 18. A thin overlay 19 of plywood for example is secured in any suitable manner on table 16 and an elongated slot 20 is provided in the table 16 and overlay 19 through which the sawblade 14 projects in the normal use of the saw.

Table 16 is adapted to support a fence member 22 on the work-supporting surface 24 thereof. The fence member 22 is made of a material which can be cut by the sawblade 14 and is generally of waste milled stock which is dressed on four sides. As will be pointed out in more detail in the explanation of the operation of the invention, the fence member 22 provides support for a workpiece 26, which is to be cut on the saw, workpiece 26 resting against the working face 27 of the fence member 22. Workpiece 26 is ordinarily held firmly in place by means of a hold-down clamp (not shown) such as that disclosed in my copending application, Ser. No. 415,397, entitled "Hold-Down Clamp Assembly," filed Dec. 2, 1964, now Patent No. 3,298,157, the clamp being removably attached to table 16. The fence member 22 should be slightly thicker than the workpiece which is being cut to provide close support for the back of the workpiece where the sawblade exists, in this manner reducing the amount of splintering.

For supporting the fence member 22 at the desired orientation on the work-supporting surface 24, table 16 is provided with a plurality of positioning posts 28. In the illustrated embodiment of the invention, the positioning posts 28 are arranged on table 16 at the four corners of an imaginary square, the sides of which are respectively parallel and perpendicular to the direction of motion of table 16. Overlay 19 is broken away as shown in FIGURE 1 to show the locations of the forward two positioning posts 28. Fence member 22 is selected to be of such length that it is able to span two of the positioning posts 28 and may be as much longer as desired to support the workpiece 26, the square arrangement of the positioning posts allowing the fence member 22 to be positioned at right angles to the direction of motion of the table 16 or at 45° to either side thereof. FIGURE 5 shows one 45° orientation of the fence member 22.

The positioning posts 28 are mounted in table 16 so as to be adjustable laterally thereon and also as to be axially movable from the extended position, which is shown in FIGURES 1 and 3, to a retracted or depressed position, as illustrated in FIGURE 4, in which the top surfaces 30 of the positioning posts 28 are flush with or slightly below the surface 24 of the table 16. It may be stated at this point that while FIGURE 1 shows all four posts in their extended positions, under normal conditions of use the positioning posts against which the fence 22 is positioned are the only ones which are extended, the idle posts being depressed into the table, and sometimes covered by overlay 19.

The details of construction of the positioning posts 28 and the mounting means therefor are illustrated in FIGURES 2-4. As shown in FIGURE 2, positioning post 28 is mounted eccentrically in a rotatable collar or block 32 which is rotatably mounted in a circular opening 34 provided at the desired location in the table 16. Externally, block 32 has a stepped construction providing a portion 36 of suitable diameter to be received in the opening 34 and a portion of larger diameter 38, these two portions defining between them a radial shoulder 40 which rests against the lower surface 42 of the table 16.

Positioning post 28 is generally cylindrical in shape and is received in an offset or eccentric circular opening 44 formed in block 32. It will be apparent that because of the offset relationship of the post 28 in the block 32, rotation of the block 32 will provide a fine adjustment of the lateral position of the post 28 on the surface of the table 16. Block 32 is held in place in the opening 34 by means of a cage element 46. Cage element 46 has a short tubular sidewall 48 which embraces the side surface of the enlarged portion 38 of block 32 and has an internal flange 50 engaging the bottom of block 32. An external flange 52 on cage 46 is provided with a pair of threaded openings 54 for the reception of clamping screws 56. Clamping screws 56 pass through suitable countersunk openings 57 in the table 16 and are freely rotatable therein, the heads of the clamping screws 56 being exposed at the surface 24 of the table 16 as shown so that the screws may be manipulated from above the surface of the table 16.

The size of the cage element 46 is made such that the flange 50 thereof will engage the bottom of the block 32 and when screws 56 are tightened will press the shoulder 40 of the block 32 against the lower surface 42 of the table 16 to hold the block 32 frictionally against rotation. When it is desired to make an adjustment of the location of the positioning post 28 on the table 16, the operator simply loosens the clamping screws 56 to release the block 32 to rotate in the opening 34. The block 32 is then rotated to the desired position, after which the clamping screws 56 are tightened to retain the adjustment.

As stated above, the post 28 is slideably mounted in the bore 44 in block 32 so as to be depressible into the table to provide a clear and unobstructed area. Means are provided for imparting a lateral spring bias to the post 28 to hold it frictionally against the wall of bore 44 to hold it in its desired position. Thus, the post 28 is provided with an elongated flat surface 58 which terminates short of the respective ends of the post 28, as shown in FIGURES 3 and 4. Surface 58 is engaged by a cylindrical plug 60 which is slidably mounted in a bore 62 formed radially in the portion 38 of the block 32, the end 64 of the plug 60 being flat to engage the flat surface 58 on the post 28. The friction force for holding the positioning post 28 in the desired position is provided by a spring 66 disposed within the bore 62. One end of spring 66 abuts against the plug 60 and the opposite end thereof reacts against a threaded member 68, the outer end 70 of the bore 62 being internally threaded for the reception of this member. This construction provides for convenience of assembly in that the plug 60 and the spring 66 may be inserted from the outer end of the bore 62 and also provides for adjustment of the force applied by the spring 66. The amount of friction existing between the positioning post 28 and the block 32 should be sufficient to hold the positioning post 28 in its desired position and also to provide sufficient gripping action between the post 28 and block 32 so that the block may be rotated by physically grasping positioning post 28 as a handle.

Bore 62 is located in block 32 such that its axis intersects the axis of bore 44 and extends at 90° to the direction of offset of bore 44, that is at 90° to the line defined by the centers of block 32 and bore 44. The location for bore 62 is chosen so as to avoid support of the fence member 22 by the flat surface 58 on post 28, since a continuous linear adjustment is not obtainable when flat surface 58 is in contact with fence member 22. The arrangement is such that bore 62 and flat surface 58 are disposed at a location where there is a corresponding location at 180° therefrom which is displaced by the same distance from the center of block 32. Thus, when adjusting the fence member 22, if it appears that flat surface 58 is approaching engagement with fence member 22, a 180° rotation of block 32 will bring the side of post 28 opposite flat surface 58 into engagement with the fence member.

As stated above, the surface 58 on the post 28 terminates short of the ends of the positioning post 28. This construction provides a pair of stop surfaces 72 and 74 which can engage the plug 60 to prevent withdrawal of the positioning post 28 from the bore 44.

The fence member 22 and an edge of overlay 19 if desired are held in place on the surface 24 of table 16 by means of a clamp generally indicated at 76. Clamp 76 includes a bracket 78 which is attached to the table 16 on the front surface 80 thereof. Bracket 78 supports a vertically and rotatably adjustable post 82 which may be retained at any desired position by means of a conventional clamping or set screw 84. At its upper end, post 82 has a sleeve 86 which receives therewithin a horizontal arm 88, which has a contact foot 90 at one end thereof. Arm 88 is slidable in collar 86 to provide horizontal adjustment of the position of the contact foot 90 and may be locked in position by means of a clamping screw 92. It will be apparent that after the fence member 22 has been positioned on the surface 24 of table 16, the clamp 76 may be engaged with the fence member 22 to hold it firmly in place. It should be stated that the bracket 78 should be mounted below the surface 24 of table 16 so that an unobstructed area can be provided simply by lifting post 82 up out of the bracket 78. This would be necessary, for example, when a long piece of work must overhang the front edge 80 of the table.

In using the present invention, the operator first selects the two positioning posts 28 which will define the desired position of the fence member 22 and presses them upwardly from the retracted position shown in FIGURE 4 into the extended position shown in FIGURE 3, if they are not already in the extended position. The remaining positioning posts are depressed. The fence member 22 of any desired length is now placed on the table against the two positioning posts 28. The trueness of the angle between the working face 27 of the fence member 22 and the sawblade is verifiable with a suitable squaring implement. Placement of the squaring blade is taken from one side of the outline of the cut in the fence to the sawblade teeth on the same side when the fence is withdrawn as far from the sawblade as the squaring blade will reach. If the angle is found to be not correct, the clamping screws 56 for one of the positioning posts 28 are loosened to permit the block 32 to be rotated. The post 28 is grasped and the block 32 is rotated in a direction which will correct for the error in angle. The other positioning post 28 may also be adjusted if necessary. Having achieved the correct angle, the operator will tighten the clamping screws 56 to retain the block 32 in its correct position. The clamp 76 is then applied to the fence member 22 to hold it and the overlay 19, if this element is used, firmly in place. Once adjusted, posts 28 will always present the same angle to the workpiece 26, provided that the edges of fence member 22 are parallel and also that there are no bumps in face 27. In the latter event, fence member 22 should be replaced by a fresh piece of milled stock.

The use for fence member 22 of a material which can be cut by the sawblade 14 provides a convenient method of aligning the work for cutting. Thus, after the fence member 22 has been properly positioned and clamped in place on the table surface 24, the sawblade is started and the table is advanced to bring the fence member into contact with the sawblade 14 so as to cut a notch, indicated at 94 in FIGURE 1 in the fence member 22. A similar notch is indicated at 95 in FIGURE 5. As will be appreciated, the notches 94 and 95 will provide for the operator an exact indication of the point where the width of the sawblade 14 will emerge from the work 26. The operator will then position or align the usual line indicating the desired line of cut, indicated at 96, against any part of the notch 94 to precisely position the workpiece 26 for cutting. He may then clamp down the workpiece in the selected position using a hold down such as that disclosed in my copending application mentioned above.

Not only can this invention provide for an exact indication of the point where the sawblade 14 will emerge from the work at the fence member 22, but it also can indicate where the blade enters the workpiece and also the exact line of cut along the entire length, or partial length as desired, of the sawblade travel. Furthermore, the workpiece can be placed into selected position along the line of cut and held in that position before and during the cutting operation itself.

The method by which the above is accomplished is as follows. First, the sawblade 14 is lowered below the table surface 24 and a fresh overlay 19 is placed upon the table surface and is butted against posts 28. Fence member 22 is placed in position and held in place by clamp 76, which in turn secures the edge of overlay 19 to the table. The far end of the overlay is held in place in any desired manner, as by means of the hold downs described in the aforementioned copending applications.

The sawblade power is then turned on and the sawblade is raised up so that it cuts its way through overlay 19. Reciprocation of table 16 then cuts out the entire path of the sawblade 14 in overlay 19 as well as notch 94 in fence member 22. It should be apparent that the sawblade cut thus formed will indicate the exact width and line of sawblade travel and therefore the point where the sawblade will enter the workpiece as well as the exit point at notches 94 and 95.

Because the operator can align his workpiece anywhere along the outline of the sawblade cut by merely lining up the workpiece marker line 96 and by securing the workpiece in its selected position by means of suitable hold down clamps, it naturally follows that cuts of any angle can be set up without the need for taper jigs or other devices generally required to assist the operator in setting up his work. Therefore, by this positive means of adjusting the layout along the outline of cut in advance of the actual cutting operation, with the full assurance that the cut actually will take place exactly as set up, it becomes possible for an inexpert to produce a quality of workmanship fully comparable to that of the best expert.

There are the additional advantages that the workpiece 24 is supported on the overlay 19 and also against the fence 22 to the absolute edge of the sawblade teeth and that splintering of the workpiece where the blade leaves it at the back and bottom is thereby reduced to an absolute minimum.

When it is desired to clear the table 16 to provide an unobstructed surface thereon, the clamp 76 is released from holding engagement with the fence member 22, and the post 28 is lifted upwardly and out of the bracket 78. The fence member 22 is removed from the surface of the table and each of the positioning posts 28 which has been in the extended position is pressed down into the position illustrated in FIGURE 4. The surface 24 is now clear and unobstructed.

The invention is not intended to be limited to the particular form or details of construction shown but within the scope of the appended claims may be practiced otherwise than as herein specifically described.

I claim:

1. A sliding table saw comprising a sawblade, a movable work-supporting table, said sawblade normally projecting through an elongated slot in said table, means including a plurality of positioning posts for supporting a fence member on said table, and means mounting each of said positioning posts in said table for axial movement between an extended position in which said post projects above the surface of said table and a retracted position in which said post lies wholly below the surface of said table.

2. A sliding table saw as defined in claim 1, further comprising clamp means for securing said fence member in place on said table.

3. A sliding table saw as defined in claim 1 wherein said fence member rests against two of said positioning posts to define a predetermined orientation of said fence member on said table, said mounting means for at least one of said two positioning posts including means for laterally moving said positioning post whereby the location of said positioning post on said table may be adjusted.

4. A sliding table saw as defined in claim 3, further comprising removable clamp means on said table, said clamp means being selectively engageable with said fence member to secure said fence member in place on said table.

5. A sliding table saw as defined in claim 1 wherein said fence member rests against two of said positioning posts to define a predetermined orientation of said fence member on said table, said table having a plurality of circular openings therein, each of said positioning post mounting means being rotatably disposed in one of said openings and said positioning posts being eccentrically carried by said mounting means whereby rotation of a mounting means will move its positioning post laterally on said table.

6. A sliding table saw as defined in claim 5, further comprising means accessible from above the surface of said table for selectively securing each of said positioning post mounting means against rotation with respect to said table.

7. A sliding table saw as defined in claim 5, each of said positioning post mounting means comprising a block having a circular portion disposed within one of said table openings and an enlarged flange portion engaging the bottom of said table, each positioning post being cylindrical and having an elongated flat surface formed on the side thereof, said flat surface terminating short of the ends of said post to define a pair of radial stop surfaces thereon, and a spring-pressed plug slidably mounted in said block for movement in a direction radially of said post and normal to the direction of eccentric offset of said post, said plug having a flat end surface resting against the flat surface of said post, said plug being engageable by said stop surfaces to limit the axial movement of said post.

8. A sliding table saw as defined in claim 5, in which there are four of said positioning posts mounted on said table at positions defining a square the respective sides of which are parallel and perpendicular to the direction of movement of said table, whereby a fence member made of a substantially rectangular piece of material may be disposed at 90° and at 45° to either side of the direction of movement of said table.

9. A sliding table saw as defined in claim 8, further comprising removable clamp means on said table, said clamp means being selectively engageable with said fence member to secure said fence member in place on said table.

10. A method of preparing a work-supporting fence on a sliding table saw having a sawblade and a movable work supporting table, the sawblade normally projecting through an elongated slot in said table, comprising the steps of placing a disposable fence member on said table, said fence member being made of a material which can be cut by said sawblade, securing said fence member to said table in the desired position to support a workpiece to be cut, at least a portion of said fence member overlying said slot, and advancing said table to move said fence member into said saw to cut a notch therein, whereby said notch may be used as an index to align a work-piece mark for precise cutting of said workpiece.

References Cited

UNITED STATES PATENTS

| | | | |
|---|---|---|---|
| 2,752,960 | 7/1956 | Poeltl | 143—52 XR |
| 2,966,177 | 12/1960 | Weiskopf | 143—52 |

WILLIAM W. DYER, Jr., *Primary Examiner.*

W. D. BRAY, *Assistant Examiner.*